United States Patent
Seto et al.

(10) Patent No.: US 8,041,493 B2
(45) Date of Patent: Oct. 18, 2011

(54) CRUISE CONTROL DEVICE AND METHOD FOR CONTROLLING THE RUNNING OF A VEHICLE

(75) Inventors: Yoji Seto, Yokohama (JP); Tsuneyuki Watanabe, Isehara (JP)

(73) Assignee: Nissan Motor Co., Ltd., Yokohama-shi, Kangawa (JP)

( * ) Notice: Subject to any disclaimer, the term of this patent is extended or adjusted under 35 U.S.C. 154(b) by 890 days.

(21) Appl. No.: 12/046,125

(22) Filed: Mar. 11, 2008

(65) Prior Publication Data
US 2008/0270001 A1  Oct. 30, 2008

(30) Foreign Application Priority Data
Apr. 25, 2007 (JP) ................... 2007-115364

(51) Int. Cl.
*B60T 7/12* (2006.01)
(52) U.S. Cl. .......................... 701/93; 340/441
(58) Field of Classification Search ............ 701/93, 701/117, 213; 340/438, 441
See application file for complete search history.

(56) References Cited

U.S. PATENT DOCUMENTS

| | | | |
|---|---|---|---|
| 6,134,499 A | 10/2000 | Goode et al. | |
| 6,166,658 A | 12/2000 | Testa | |
| 7,660,658 B2 * | 2/2010 | Sheynblat | 701/93 |
| 2002/0173881 A1 * | 11/2002 | Lash et al. | 701/1 |
| 2006/0271265 A1 | 11/2006 | Kawazoe et al. | |
| 2007/0067086 A1 * | 3/2007 | Rothschild | 701/93 |
| 2007/0262883 A1 * | 11/2007 | Kumabe | 340/936 |

FOREIGN PATENT DOCUMENTS
FR    2 849 342 A    2/2004
JP    HEI 7-085400    3/1995
* cited by examiner

*Primary Examiner* — Mark Hellner
(74) *Attorney, Agent, or Firm* — Young Basile

(57) ABSTRACT

A cruise control device and method for controlling a vehicle such that the driver can set the speed setting at will, and the speed of the vehicle is controlled to match the speed setting. The speed limit for the road on which the vehicle is traveling is detected, and when the detected speed limit changes from a first speed limit to a second speed limit, the speed setting is selectively changed to the second speed limit. When the driver has performed an operation to change the speed setting before the detected speed limit changes from the first speed limit to the second speed limit, changing of the speed setting to the second speed limit is selectively suppressed.

18 Claims, 8 Drawing Sheets

CRUISE CONTROL DEVICE AND METHOD FOR CONTROLLING THE RUNNING OF A VEHICLE

CROSS-REFERENCE TO RELATED APPLICATION

This application claims priority from Japanese Patent Application Serial No. 2007-115364, filed Apr. 25, 2007, which is incorporated herein in its entirety by reference.

TECHNICAL FIELD

The invention pertains to cruise control devices and methods for controlling the speed of a vehicle.

BACKGROUND

Automatic cruise control devices are known. For example, Japanese Kokai Patent Application No. Hei 7[1995]-85400 discloses a technology for limiting the highest speed during vehicle cruising to the speed limit of the road or the speed limit set by the driver.

BRIEF SUMMARY

Embodiments of a cruise control device and a method for controlling the speed of the vehicle are taught herein. One example of a cruise control device comprises a speed detector configured to detect a speed of the vehicle, an operating member configured to set a speed setting of the vehicle by an operation performed by the driver, a speed limit acquisition device configured to acquire a speed limit for a road on which the vehicle is traveling and a controller. The controller is configured to control the vehicle such that the speed detected by the speed detector matches the speed setting, wherein the controller includes a speed setting changing device configured to selectively suppress a change in the speed setting from a first speed limit to a second speed limit responsive to the speed limit changing from the first speed limit to the second speed limit if a driver operates the operating member to change the speed setting before the speed setting changes to the second speed limit.

A controller for a cruise control device can include means for controlling the vehicle such that the detected speed matches the speed setting, means for acquiring a speed limit change for a road on which the vehicle is traveling from the first speed limit to the second speed limit and means for selectively suppressing a change in the speed setting from a first speed limit to a second speed limit responsive to the speed limit change from the first speed limit to the second speed limit if a driver operates the operating member to change the speed setting before the speed setting changes to the second speed limit.

One method taught herein for controlling a vehicle wherein a speed of the vehicle is made to match a speed setting comprises acquiring a speed limit for a road on which the vehicle is traveling and, when the speed limit changes from a first speed limit to a second speed limit, selectively suppressing a change in the speed setting to the second speed limit if the driver changes the speed setting before a change to the second speed limit.

BRIEF DESCRIPTION OF THE DRAWINGS

The description herein makes reference to the accompanying drawings wherein like reference numerals refer to like parts throughout the several views, and wherein.

DETAILED DESCRIPTION OF EMBODIMENTS OF THE INVENTION

As mentioned above, in Japanese Kokai Patent Application No. Hei 7[1995]-85400 the speed setting programmed by the driver or the speed limit for the road is selected as the highest speed (speed setting). When the speed setting programmed by the driver is selected, if the speed limit for the road on which the vehicle is traveling changes from 80 km/h to 100 km/h, the speed of the vehicle is not changed, so that the vehicle fails to run according to the state of the road. This is undesirable. Conversely, if the speed limit is selected, the driver's intentions cannot be executed even when he/she sets the speed. This is also undesirable.

In contrast, according to the invention taught herein, it is possible to set the speed setting according to the state of the road and the intentions of the driver. Consequently, it is possible to realize control of control according to the state of the road and the intentions of the driver.

Figure 1:
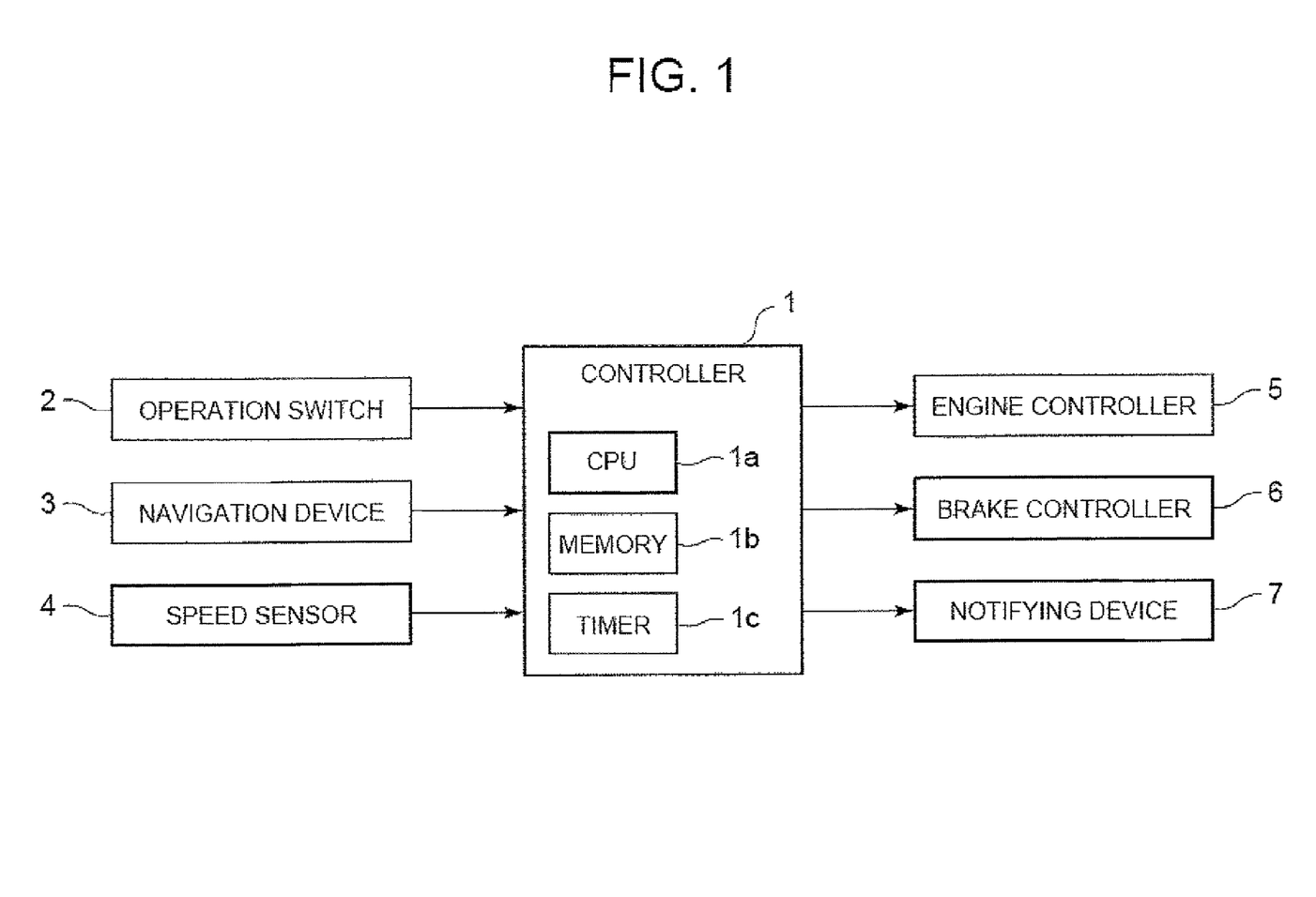
FIG. 1 is a block diagram illustrating a cruise control device for controlling the running of a vehicle according to a first embodiment.

As shown in FIG. 1, a cruise control device according to the first embodiment comprises controller 1, operation switch 2, navigation device 3, speed sensor 4, engine controller 5, brake controller 6 and notifying device 7. This device for controlling the running of a vehicle has a constant speed running control function by means of which the vehicle can run at the set speed while the driver has his/her foot off of the accelerator pedal.

The operation switch 2 is a switch for increasing or decreasing the speed setting when the vehicle is in the constant speed running control mode, and it is operated by the driver. For example, operation switch 2 has three functions, namely, setting the speed setting, increasing the speed setting and decreasing the speed setting. It can have three buttons corresponding to these respective functions, or it can have only one button performing all three of the functions. The navigation device 3 has a GPS unit, a map database, etc. Based on the location of the vehicle detected by the GPS unit and the map data stored in the map database, the navigation device 3 can determine the road on which the vehicle is traveling. Stored together with the map database, map data includes information about the road type (highway, ordinary road, etc.) as well as information concerning the speed limit for each road. The navigation device 3 detects the speed limit for the road on which the vehicle is traveling.

The speed sensor 4 detects the speed of the vehicle. Based on an instruction from controller 1, to be explained later, engine controller 5 adjusts the opening of the throttle (not shown) in order to control the engine torque and thus to control the acceleration/deceleration of the vehicle. Based on an instruction from controller 1, to be explained later, brake controller 6 controls the brake hydraulic pressure of the hydraulic brake provided on each wheel in order to control deceleration of the vehicle.

The notifying device 7 is, for example, a speaker. Based on an instruction from controller 1, to be explained later, the notifying device 7 outputs a voice message to inform the driver of any change in the speed limit for the road on which the vehicle is traveling.

The controller 1 generally comprises a microcomputer including a CPU 1a, memory 1b and a timer 1c. It computes an engine torque instruction value and a brake hydraulic pressure instruction value for making the speed of the vehicle, detected with speed sensor 4, match the speed setting using a software program stored in memory 1b and operated by the CPU 1a. Alternatively, the functions of the controller 1 as described herein can be performed by a combination of software and hardware. The controller 1 outputs the engine torque instruction value and the brake hydraulic pressure instruction value to engine controller 5 and brake controller 6, respectively. As will be explained later, the speed setting is set based on the operation signal input from operation switch 2 and the information concerning the speed limit for the road on which the vehicle is traveling input from navigation device 3. Engine controller 5 and brake controller 6 can be conventional engine control units known to those skilled in the arts.

In principle, controller 1 sets the speed setting based on the speed set by the driver by means of operation switch 2. However, when the speed limit for the road on which the vehicle is traveling changes from a first speed limit to a second speed limit, the controller 1 sets the second speed limit as the speed setting. For example, assuming that the constant speed running control is performed at a speed setting of 95 km/h, if the speed limit for the road on which the vehicle is traveling changes from 100 km/h to 80 km/h, the speed setting is changed to 80 km/h. Similarly, when constant speed running control is performed at a speed setting of 75 km/h, if the speed limit for the road on which the vehicle is traveling changes from 80 km/h to 100 km/h, the speed setting is changed to 100 km/h. As a result, it is possible to automatically change the speed setting corresponding to the state of the road on which the vehicle is traveling. Moreover, there can be also the case in which the vehicle is in the constant speed running control mode at a certain speed limit (for example, 100 km/h), and the speed limit changes from 100 km/h to 80 km/h. Naturally, in this case, the speed setting is also changed to 80 km/h. Even after the speed setting is set at the speed limit, the driver still can make use of operation switch 2 to change the speed setting at will.

According to this embodiment, when the driver operates operation switch 2 to change (increase or decrease) the speed setting, control to make the speed setting match the changed speed limit is prohibited during a prescribed period of time (for example, 10 sec) after operating operation switch 2, even if there is a change in the road speed limit. For example, when the vehicle is running in the constant speed running control mode at a speed setting of 95 km/h, for a period of 10 sec from when the driver changes the speed setting to 78 km/h, the speed setting is kept at 78 km/h instead of changing to 80 km/h even if the speed limit for the road on which the vehicle is traveling changes from 100 km/h to 80 km/h. As a result, it is possible to prevent the speed setting from automatically changing to another value soon after the driver intentionally changes the speed setting.

Figure 2:
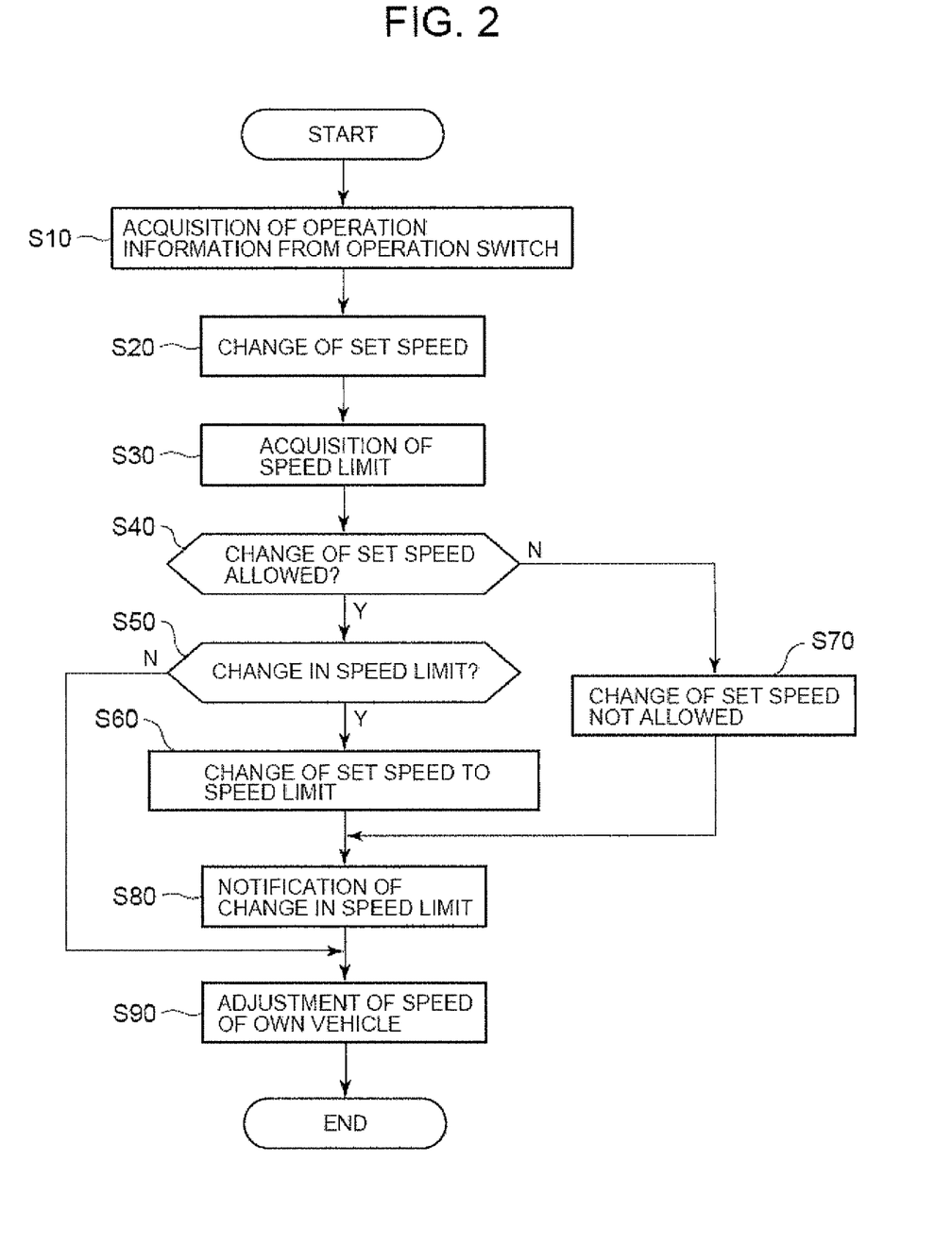
FIG. 2 is a flow chart illustrating the processing steps performed in the first embodiment.

FIG. 2 is a flow chart illustrating the processing steps performed in this embodiment. When the driver rotates a switch, for example, for starting the constant speed running control mode, CPU 1a of controller 1 starts the processing of step S10.

In step S10 the operation information indicating the operating state of operation switch 2 is obtained from operation switch 2, and flow proceeds to step S20. In step S20 the speed setting is changed based on the operation information of operation switch 2 acquired in step S10.

When operation switch 2 is turned in a direction to increase the speed setting, speed setting Vset is computed using equation (1) shown below. Here, Vset_old refers to the speed setting in the last processing cycle, and ΔVup indicates the prescribed increase in the speed setting.

$$Vset = Vset\_old + \Delta Vup \quad (1)$$

When operation switch 2 is turned in a direction to decrease the speed setting, speed setting Vset is computed using equation (2) shown below. Here, Vset_old refers to the speed setting in the last processing cycle, and ΔVdown indicates the prescribed decrease in the speed setting.

$$Vset = Vset\_old + \Delta Vdown \quad (2)$$

When operation information that the driver did not operate operation switch 2 is acquired in step S10, no change in the speed setting is performed in step S20. On the other hand, when operation information that the driver did operate operation switch 2 is acquired, counting is started by timer 1c.

In step S30, which follows step S20, information concerning the speed limit Vlimit for the road on which the vehicle is traveling is acquired from navigation device 3, and flow then proceeds to step S40. In step S40, a judgment is made as to whether the speed setting can be changed to correspond to the change in the speed limit Vlimit of the road on which the vehicle is traveling. As explained above, until a prescribed time has elapsed from when operation switch 2 was operated by the driver (the operation of changing the speed setting), that is, during a prescribed time period following the start of counting by timer 1c, a judgment is made that it is impossible to change the speed setting to correspond to the change in speed limit Vlimit. When a change in the speed setting can be made, flow proceeds to step S50. When a change in the speed setting cannot be made, flow proceeds to step S70.

In step S50 a judgment is made as to whether the speed limit for the road on which the vehicle is traveling has changed based on information concerning speed limit Vlimit acquired from navigation device 3. If the speed limit Vlimit of the road on which the vehicle is traveling has changed, flow proceeds to step S60. If the speed limit has not changed, flow proceeds to step S90.

Figure 3:
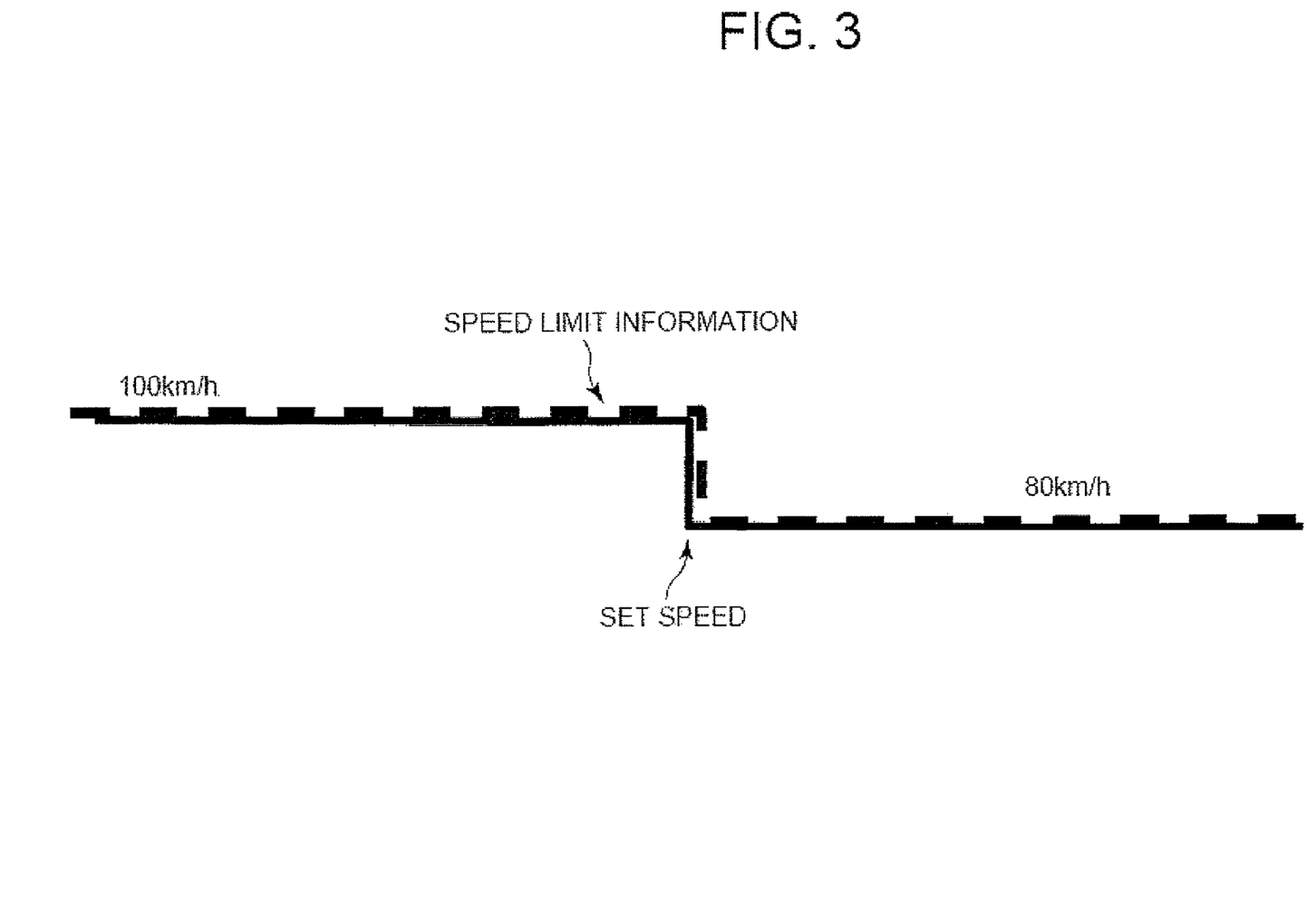
FIG. 3 is a diagram illustrating changing of the speed setting from 100 km/h to 80 km/h in conjunction with a change of the speed limit for the road from 100 km/h to 80 km/h.

In step S60 the speed setting is made to match the changed speed limit Vlimit. For example, when the speed limit Vlimit of the road on which the vehicle is traveling has changed from 100 km/h to 80 km/h, the speed setting is set at 80 km/h. FIG. 3 is a diagram illustrating the change in the speed setting from 100 km/h to 80 km/h in conjunction with the change from 100 km/h to 80 km/h in the speed limit Vlimit for the road on which the vehicle is traveling.

On the other hand, in step S70, during the elapse of a prescribed time period as counted by timer 1c, even if the speed limit Vlimit for the road on which the vehicle is traveling changes, processing for changing the speed setting to the changed speed limit is not performed.

Figure 4:
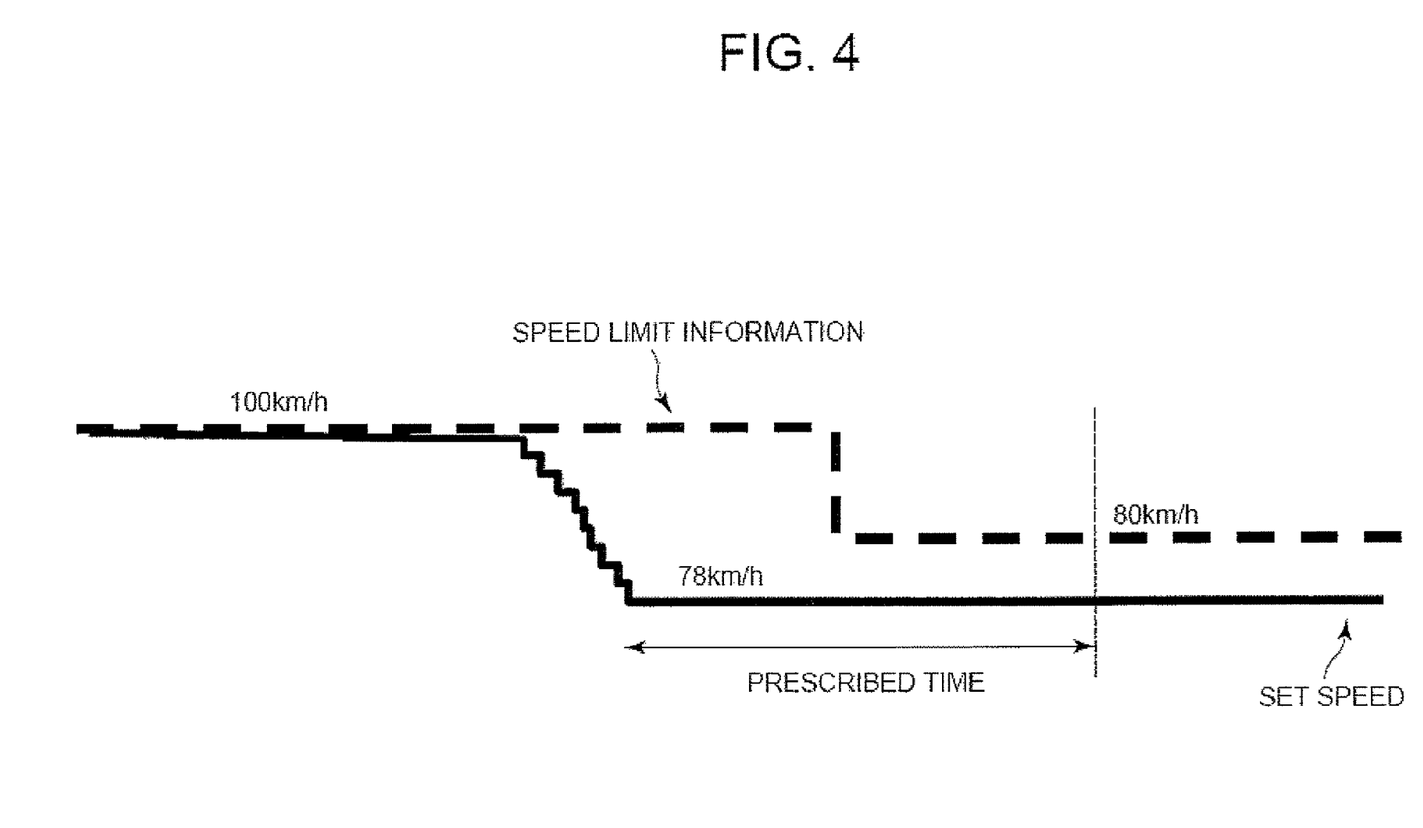
FIG. 4 is a diagram illustrating changing of the speed setting when the driver has changed the speed setting to 78 km/h immediately before the speed limit for the road changes from 100 km/h to 80 km/h.

FIG. 4 is a diagram illustrating change in the speed setting when the driver makes use of operation switch 2 to change the speed setting to 78 km/h immediately before a change from 100 km/h to 80 km/h in the speed limit Vlimit for the road on which the vehicle is traveling. As explained above, during a prescribed time period after the driver has operated operation switch 2, a change in the speed setting corresponding to the change in the speed limit Vlimit is prohibited. Consequently, the speed setting is still not changed from 78 km/h to 80 km/h even when the speed limit changes from 100 km/h to 80 km/h. As a result, for example, assuming the driver has seen an 80 km/h speed limit sign and has changed the speed setting to 78 km/h, a little lower than 80 km/h, it is possible to prevent the speed setting from changing to 80 km/h immediately after entering the road region having a speed limit of 80 km/h.

In the example shown in FIG. 4, assume that the driver operates operation switch 2 to change the speed setting to 90 km/h. For example, there may be a case in which the actual speed limit for a road changes from 80 km/h to 90 km/h despite the fact that the speed limit information acquired from navigation device 3 shows the speed limit to be 80 km/h. That is, according to the old data stored in navigation device 3, the speed obtained by the change made by the driver (90 km/h) exceeds the speed limit, but in fact it is not actually over the speed limit. There is no specific problem in this case. Also, when the actual speed limit is 80 km/h, the driver can change the speed setting to 80 km/h or less upon seeing the speed limit sign.

When the processing in step S60 or step S70 has been performed, flow proceeds to step S80. In step S80, when the speed limit for the road on which the vehicle is traveling changes, a message notifying the driver of change in the speed limit is provided by means of notifying device 7. For example, a voice message of "Speed limit has changed from 100 km/h to 80 km/h" can be output from a speaker serving as the notifying device 7. After the processing of step S80, flow proceeds to step S90.

In step S90 the instruction value is computed for making the speed detected by speed sensor 4 match the speed setting. For example, when the speed of the vehicle is lower than the speed setting, an engine torque instruction value for accelerating the vehicle is computed and output to engine controller 5. On the other hand, when the speed of the vehicle is higher than the speed setting, an engine torque instruction value and a brake hydraulic pressure instruction value for decelerating the vehicle are respectively computed. The engine torque instruction value is output to engine controller 5, while the brake hydraulic pressure instruction value is output to brake controller 6. As a result, the speed of the vehicle is maintained at the speed setting.

According to this embodiment, the device for controlling the vehicle speed to match the speed setting acquires the speed limit for the road on which the vehicle is traveling. When the acquired speed limit changes from a first speed limit to a second speed limit, the speed setting is changed to the second speed limit. In this way, it is possible to set the speed setting to correspond to the state of the road, so that it is possible to perform constant speed running control corresponding to the state of the road. For example, when the speed limit for the road changes from 100 km/h to 80 km/h, if the vehicle is running at a constant speed of 100 km/h, the speed setting is automatically changed from 100 km/h to 80 km/h. Consequently, there is no need for the driver to perform the operation to change the speed setting to 80 km/h.

Similarly, when the speed limit for the road changes from 80 km/h to 100 km/h, the speed setting is automatically changed to 100 km/h. Consequently, there is no need for the driver to perform an operation to change the speed setting to 100 km/h. On the other hand, in the conventional device that only limits the highest speed of the vehicle, even if the speed limit for the road changes from 80 km/h to 100 km/h, the speed setting is still not changed from 80 km/h. Consequently, the driver has to perform the operation to change the speed setting to 100 km/h. Also, when the speed setting is to be set at 95 km/h on a road with a speed limit of 100 km/h, according to this embodiment it is only necessary to perform the operation to lower the speed setting from the automatically changed value of 100 km/h by 5 km/h. On the other hand, with the conventional device that only limits the highest speed the driver must perform the operation of increasing the speed by 15 km/h, from 80 km/h to 95 km/h.

Also, according to this embodiment, change of the speed setting based on the change in speed limit is prohibited within a prescribed time from a change of the speed setting by the driver's manipulation of the operation switch 2. As a result, assuming the driver to have changed the speed setting from 100 km/h to 78 km/h immediately before the speed limit for the road on which the vehicle is traveling changes from 100 km/h to 80 km/h, a change of the speed setting from 78 km/h to 80 km/h can be prevented for a period after the vehicle has entered the road region with a speed limit of 80 km/h. That is, when the speed setting is changed, the intentions of the driver take priority.

In addition, according to this embodiment, when the speed limit for the road on which the vehicle is traveling changes, the driver is notified of the change in the speed limit so that the driver can easily learn of changes in the speed limit.

Figure 5:
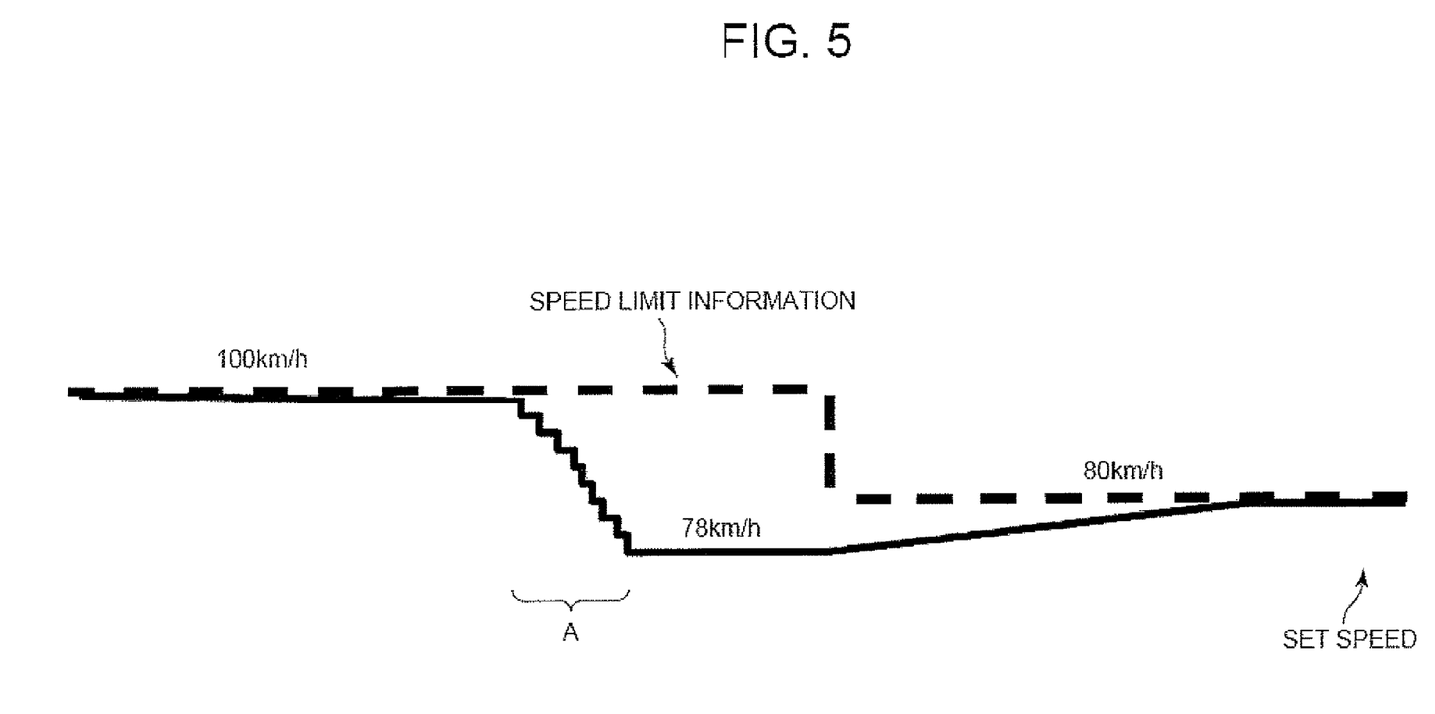
FIG. 5 is a diagram illustrating changing of the speed setting in a second embodiment when the speed limit for the road on which the vehicle is traveling changes within a prescribed time after the driver has changed the speed setting by operating an operation switch.

According to a second embodiment when the speed limit for the road on which the vehicle is traveling changes within a prescribed time after the driver has changed the speed setting by operating operation switch 2, the amount of change per unit time is reduced when the speed setting is changed to the new speed limit.

FIG. 5 is a diagram illustrating change in the speed setting in this second embodiment when the speed limit for the road on which the vehicle is traveling changes within a prescribed time after the driver has changed the speed setting by operating operation switch 2. As shown in FIG. 3, if the amount of change per unit time is not lowered when the speed limit changes after a change of the speed setting, when the speed limit changes from a first speed limit to a second speed limit the speed setting is changed quickly to the second speed limit. However, by reducing the change per unit time when the speed setting is changed to the second speed limit, the time required for the speed setting to match the second speed limit becomes longer in the second embodiment. As a result, when the driver has changed the speed setting immediately before the speed limit changes from a first speed limit to a second speed limit, it is possible to prevent the speed setting from changing to the second speed limit immediately after the vehicle has entered the road region with the second speed limit.

Figure 6:
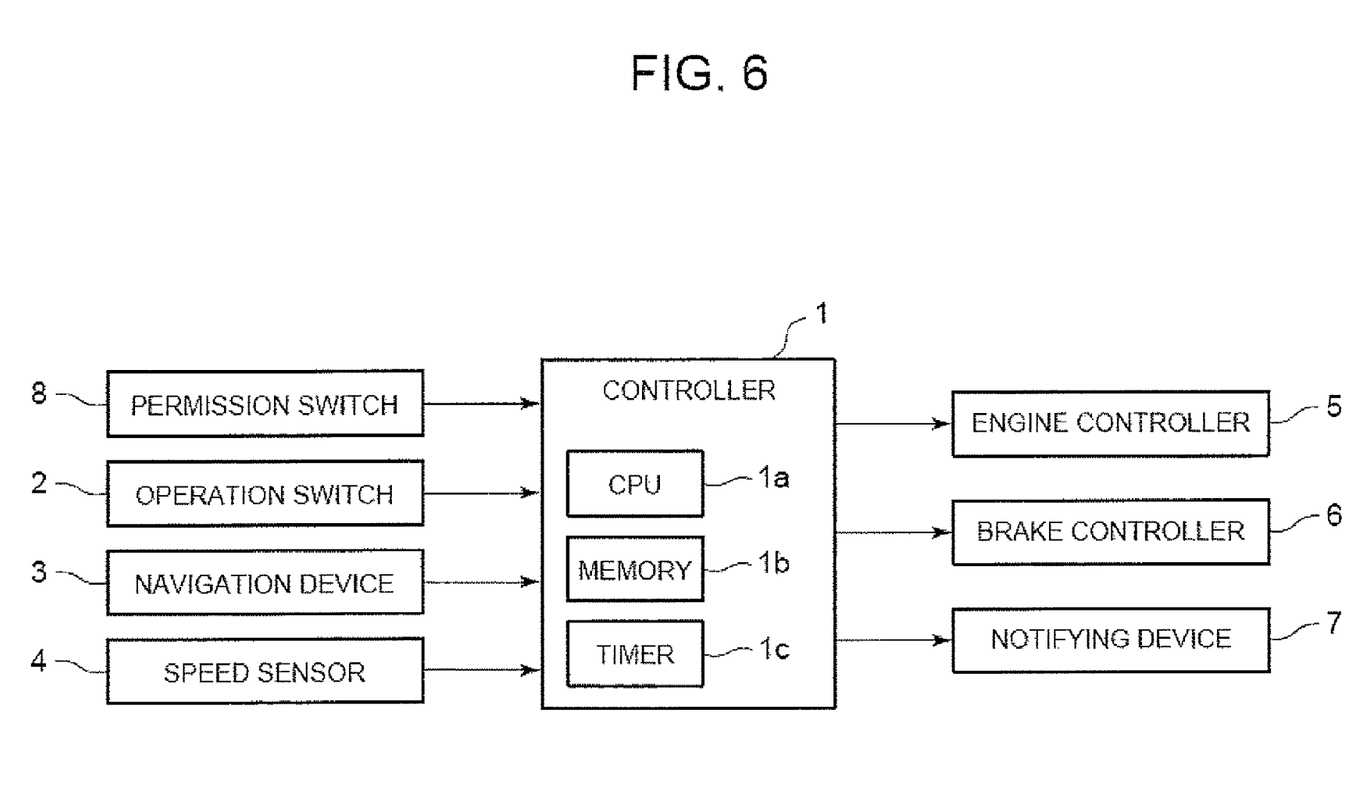
FIG. 6 is a block diagram illustrating a cruise control device for controlling the running of a vehicle according to a third embodiment.

According to a third embodiment shown in FIG. 6, the cruise control device also has permission switch 8 in addition to the components of the cruise control device shown in FIG. 1.

The permission switch 8 is a switch for the driver to give a yes/no instruction relative to permission for processing that prohibits changing the speed setting based on a change in the speed limit within a prescribed time after the driver has changed the speed setting by operating operation switch 2.

That is, by operating permission switch 8, the driver can pre-select whether to allow or not allow the processing that prohibits a change in the speed setting based on a change in the speed limit within a prescribed time after the driver has changed the speed setting by operating operation switch 2.

Only when the permission instruction from permission switch 8 is YES will controller 1 perform the processing that prohibits changing the speed setting based on a change in the speed limit within a prescribed time after the driver has changed the speed setting by operating operation switch 2. Conversely, if the instruction from permission switch 8 is NO, when the speed limit for the road changes from a first speed limit to a second speed limit within a prescribed time after the driver has changed the speed setting by operating operation switch 2, processing is performed so that the speed setting is changed to the second speed limit without delay.

According to the third embodiment, only when there is permission from the driver can processing be performed for prohibiting a change in the speed setting based on a change in the speed limit within a prescribed time after the driver has changed the speed setting by operating operation switch 2. Consequently, the intentions of the driver are given priority in the processing.

Figure 7:
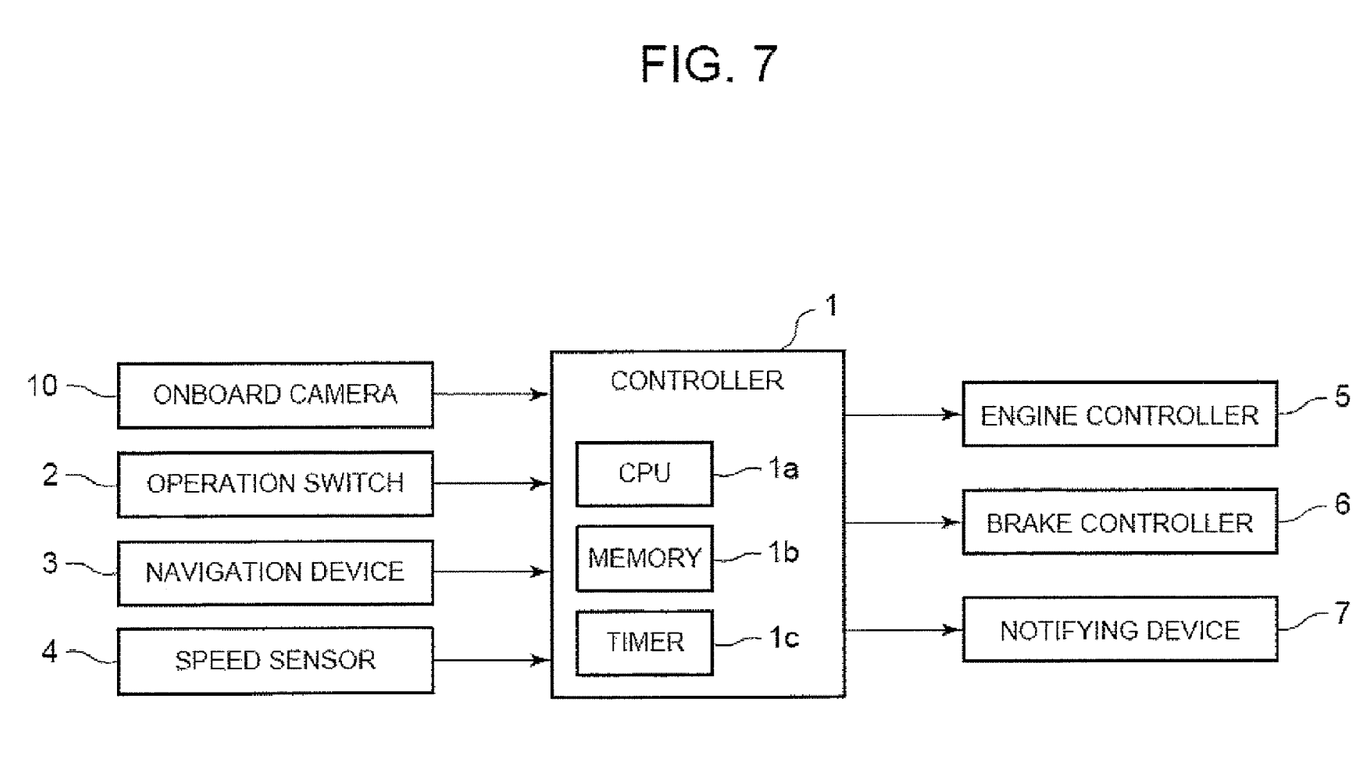
FIG. 7 is a diagram illustrating the first embodiment shown in FIG. 1 with an onboard camera.

The invention is not limited to these embodiments. For example, in the first, second or the third embodiment, the speed limit for the road on which the vehicle is traveling is detected by navigation device 3. However, other detection methods can be adopted. FIG. 7 is a diagram illustrating inclusion of an onboard camera 10 in addition to the device shown in FIG. 1. The onboard camera 10 takes pictures of the scene ahead of the vehicle. The controller 1 performs image processing of the pictures taken by the onboard camera 10 according to known techniques. As a result, signs indicating the speed limit are detected, and the speed limit shown on the detected sign is recognized.

Figure 8:
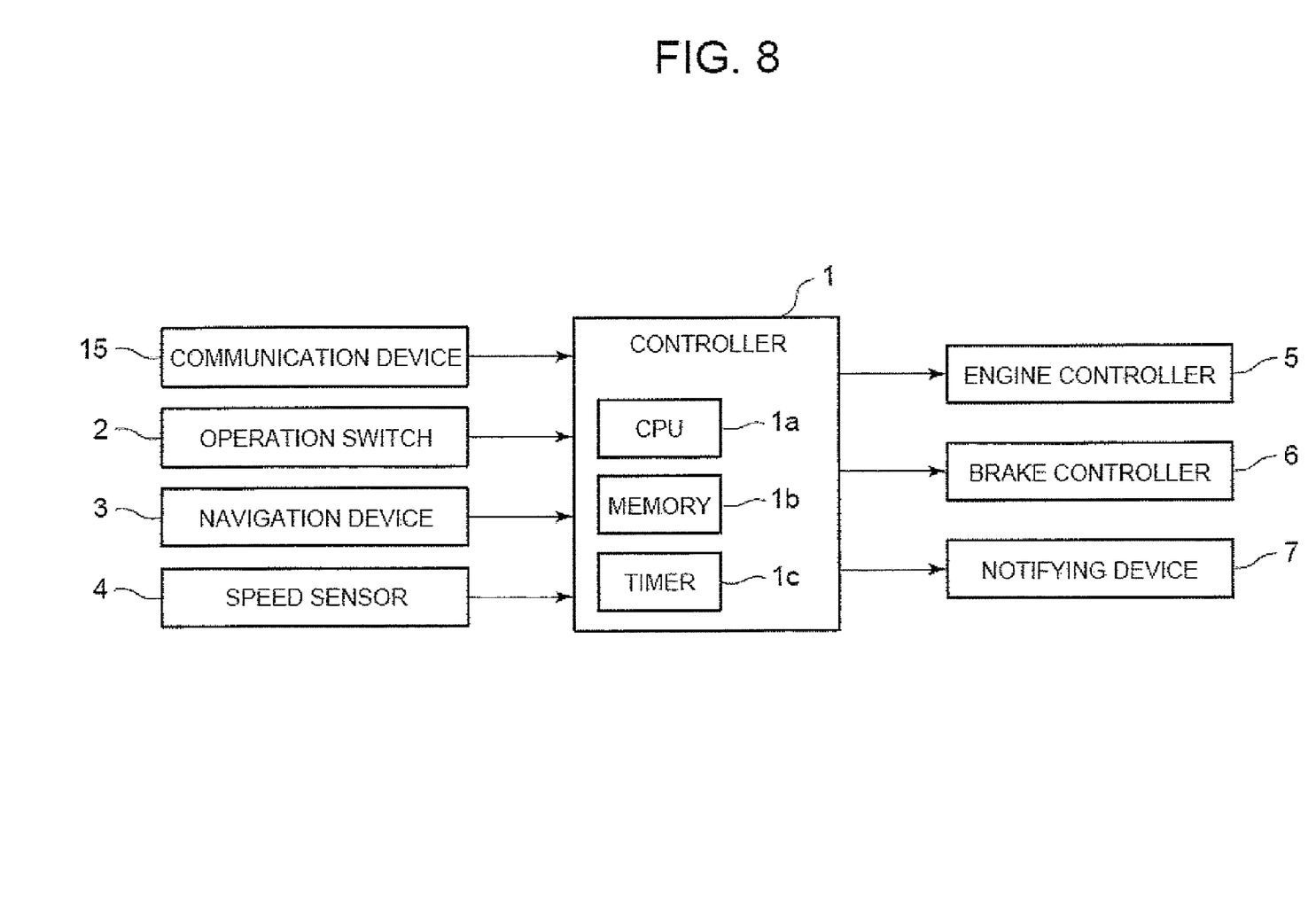
FIG. 8 is a diagram illustrating a controller shown in FIG. 1 with a communication device for performing vehicle-road communication.

FIG. 8 is illustrates a situation where there is also a communication device 15 for communicating between the road and vehicle in addition to the device shown in FIG. 1. The communication device 15 is a device for using the VICS information communication system or the like. In this modification, speed limit information for the road is acquired by communicating with road-side units placed along the road in a known manner.

In the first embodiment, a change of the speed setting based on the change in the speed limit is prohibited within a prescribed time after the driver has changed the speed setting by operating operation switch 2. However, a scheme can also be adopted in which a change in the speed setting based on the speed limit is inhibited during the period in which the vehicle travels for a prescribed distance after the driver has changed the speed setting by operating operation switch 2. The travel distance detected may be a fixed value, such as 200 m or the like, or it may be the distance resulting from the vehicle travel at the current speed for a prescribed time (for example, 10 sec). For the cruise control in the second or the third embodiments, control may be similarly performed based on a prescribed distance (for example, 100 m) instead of a prescribed time.

According to the third embodiment, only when the driver gives permission is the processing performed to prohibit a change in the speed setting, based on a change in the speed limit, within a prescribed time after the driver has changed the speed setting by operating operation switch 2. Similarly, in the second embodiment a scheme can also be adopted in which driver permission is required for processing to be performed to reduce the amount of change per unit time for a prescribed time after the driver has changed the speed setting by operating operation switch 2 when the speed setting is being changed to match a new speed limit.

A speaker for voice messages has been presented as an example of notifying device 7 for notifying the driver of a change in the speed limit for the road on which the vehicle is traveling. However, the invention is not limited to a speaker. For example, notifying device 7 can also be a display unit that displays changes in the speed limit, or an indicator lamp that lights up to signify a change in the speed limit.

Accordingly, the above-described embodiments have been described in order to allow easy understanding of the invention and do not limit the invention. On the contrary, the invention is intended to cover various modifications and equivalent arrangements included within the scope of the appended claims, which scope is to be accorded the broadest interpretation so as to encompass all such modifications and equivalent structure as is permitted under the law

What is claimed is:

1. A cruise control device for controlling operation of a vehicle, comprising:
    a speed detector configured to detect a speed of the vehicle;
    an operating member configured to set a speed setting of the vehicle by an operation performed by the driver;
    a speed limit acquisition device configured to acquire a speed limit for a road on which the vehicle is traveling; and
    a controller configured to control the vehicle such that the speed detected by the speed detector matches the speed setting, wherein the controller includes a speed setting changing device configured to selectively suppress a change in the speed setting from a first speed limit to a second speed limit responsive to the speed limit changing from the first speed limit to the second speed limit if a driver operates the operating member to change the speed setting before the speed setting changes to the second speed limit, wherein the speed setting changing device is configured to suppress the change of the speed setting to the second speed limit for a prescribed time after the driver operates the operating member to change the speed setting.

2. The device according to claim 1 wherein the prescribed time is a period of vehicle travel for a prescribed distance after the driver operates the operating member to change the speed setting.

3. The device according to claim 1 wherein the speed setting changing device is further configured to prohibit the change of the speed setting to the second speed limit.

4. The device according to claim 1 wherein the speed setting changing device is further configured to reduce an amount of change per unit time when the speed setting is changed to the second speed limit.

5. The device according to claim 1, further comprising:
    an instructing member configured to enable the driver to give a permission instruction regarding operation of the speed setting changing device; and wherein
    the speed setting changing device is configured to suppress the change of the speed setting to the second speed limit only when the driver gives permission with the instructing member.

6. The device according to claim 1, further comprising:
    a notifying device configured to notify the driver that the speed limit is changing from the first speed limit to the second speed limit.

7. A controller for a cruise control device for controlling operation of a vehicle including a speed sensor that detects a speed of the vehicle, an operating member configured to set a speed setting of the vehicle responsive to an operation performed by the driver, a speed limit acquisition device configured to acquire a speed limit of a road on which the vehicle is traveling, the controller comprising:

means for controlling the vehicle such that the detected speed matches the speed setting;

means for acquiring a speed limit change for a road on which the vehicle is traveling from the first speed limit to the second speed limit; and means for selectively suppressing a change in the speed setting from a first speed limit to a second speed limit responsive to the speed limit change from the first speed limit to the second speed limit if a driver operates the operating member to change the speed setting before the speed setting changes to the second speed limit, wherein the means for selectively suppressing the change is configured to suppress the change of the speed setting to the second speed limit for a prescribed time after the driver operates the operating member to change the speed setting.

8. A method for controlling a vehicle wherein a speed of the vehicle is made to match a speed setting, the method comprising:

acquiring a speed limit for a road on which the vehicle is traveling; and when the speed limit changes from a first speed limit to a second speed limit, selectively suppressing a change in the speed setting to the second speed limit if the driver changes the speed setting before a change to the second speed limit, wherein selectively suppressing the change in the speed setting further comprises suppressing the change of the speed setting to the second speed limit for a prescribed time after the driver operates the operating member to change the speed setting.

9. The method according to claim 8, further comprising: reducing an amount of change per unit time when the speed setting is changed to the second speed limit.

10. The method according to claim 8, further comprising: notifying the driver that the speed limit is changing from the first speed limit to the second speed limit.

11. The method according to claim 8 wherein the prescribed time is a period of vehicle travel for a prescribed distance after the driver operates the operating member to change the speed setting.

12. The method according to claim 11, further comprising: reducing an amount of change per unit time when the speed setting is changed to the second speed limit.

13. The method according to claim 11, further comprising: notifying the driver that the speed limit is changing from the first speed limit to the second speed limit.

14. The method according to claim 8 wherein selectively suppressing the change in the speed setting further comprises prohibiting the change of the speed setting to the second speed limit.

15. The method according to claim 8, further comprising: notifying the driver that the speed limit is changing from the first speed limit to the second speed limit.

16. The method according to claim 8, further comprising: reducing an amount of change per unit time when the speed setting is changed to the second speed limit.

17. The method according to claim 8 wherein selectively suppressing the change in the speed setting further comprises suppressing the change of the speed setting to the second speed limit only when the driver gives permission through an operation.

18. The method according to claim 8, further comprising: notifying the driver that the speed limit is changing from the first speed limit to the second speed limit.

* * * * *